No. 878,086.

PATENTED FEB. 4, 1908.

L. Z. PEARSON.
FEED TROUGH.
APPLICATION FILED SEPT. 13, 1906.

Witnesses
Frank R. Glore
H. C. Rodgers

Inventor
L. Zuard Pearson
By George H. Tharp Atty

UNITED STATES PATENT OFFICE.

L ZUARD PEARSON, OF KEARNEY, MISSOURI.

FEED-TROUGH.

No. 878,086.   Specification of Letters Patent.   Patented Feb. 4, 1908.

Application filed September 13, 1906. Serial No. 334,442.

*To all whom it may concern:*

Be it known that I, L ZUARD PEARSON, a citizen of the United States, residing at Kearney, in the county of Clay and State of Missouri, have invented certain new and useful Improvements in Feed-Troughs, of which the following is a specification.

This invention relates to feed troughs, and my object is to produce a trough of this character which can be set to accommodate feed of different characters.

A further object is to produce a device of this character of simple, strong, durable and cheap construction.

With these general objects in view and others as hereinafter appear, the invention consists in certain novel and peculiar features of construction and organization as hereinafter described and claimed, and in order that it may be fully understood reference is to be had to the accompanying drawing, in which—

Figure 1:
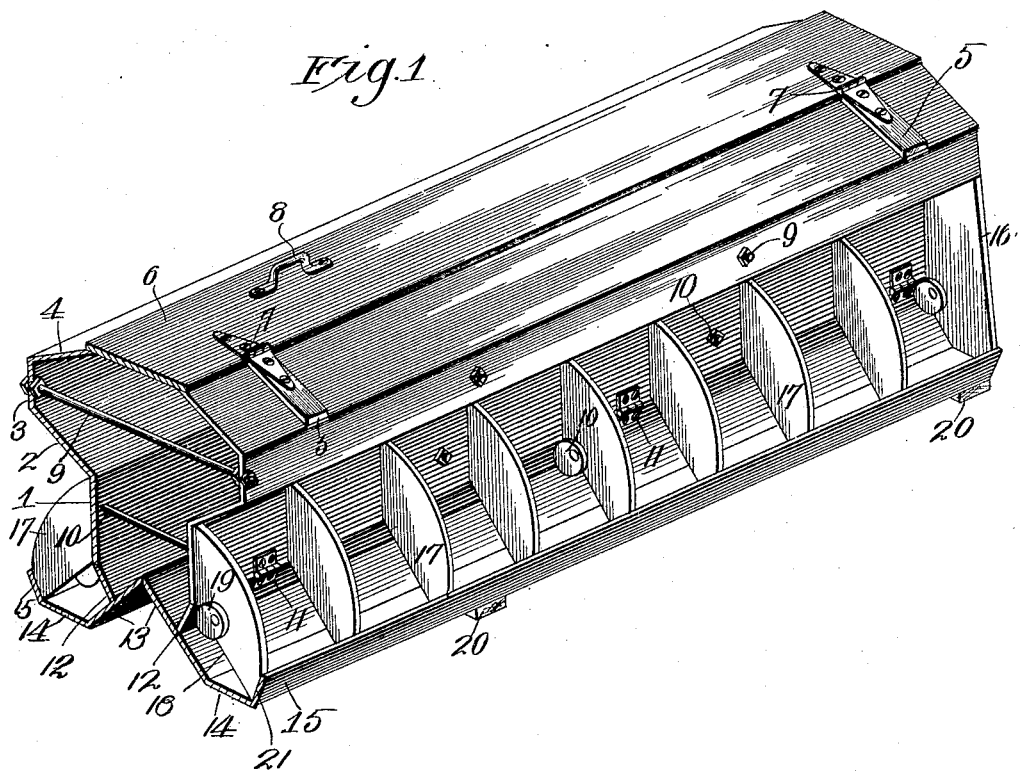
Figure 2:
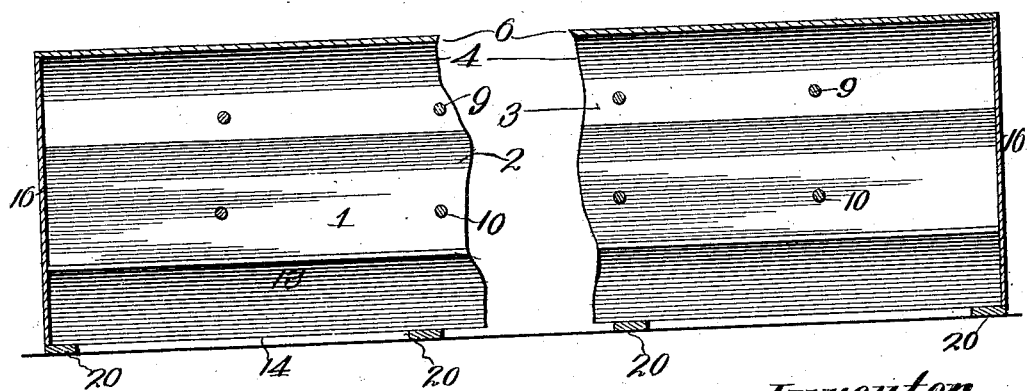

Figure 1, is a sectional perspective view of an automatic feed trough embodying my invention. Fig. 2, is a vertical central longitudinal section of the same.

In the said drawings, a hopper consists of parallel walls 1, walls 2 converging upwardly and outwardly from the upper end of walls 1, vertical walls 3 rising from the outer or upper ends of walls 2 and walls 4 converging upwardly and inwardly from the upper edges of walls 3, and secured to the upper sides of one of the walls 4 are cleats 5 to which the cover 6 is hinged as at 7, said cover having a handle 8 for convenience of manipulation when it is desired to deposit feed in the hopper. The hopper is braced by a series of cross rods 9 connecting walls 3, and by a series of cross rods 10 connecting walls 1. Hinged as at 11 to the lower edges of walls 1 are bars or valves 12, the same converging inwardly and downwardly in their normal or closed position, as shown in Fig. 1, their lower edges in such position engaging the downwardly diverging inner walls 13 of a pair of troughs.

14 indicates the bottoms of the troughs extending outwardly from the lower edges of walls 13 and 15 indicate the outer walls of the troughs, the same extending upwardly and outwardly from the outer edges of bottoms 14 and terminating in a plane below the lower edges of the valves as shown clearly in Fig. 1.

16 indicates the end walls of the troughs and 17 partitions bearing at their opposite ends against and secured to the walls 1 of the hopper, and the walls 15 of the troughs, said partitions dividing the troughs into a plurality of communicating compartments and having their downwardly and inwardly disposed edges 18 diverging downward with respect to the valves 12 to permit the latter to open sufficiently wide to accommodate bran and chop and other feeds which have a tendency to pack in the hopper and feed slowly down to the troughs, and for the purpose of limiting the opening movement of the valves to accommodate grain such as oats and other cereals or foods which will gravitate more readily from the hopper, I provide a series of eccentrically pivoted buttons 19, the same being secured on end walls 16 and one or more of the partitions 17. By properly adjusting these eccentrically pivoted buttons it is obvious that the valves may be held closed or opened at any desired angle. The device is made rigid by a series of cross cleats 20 underlying and connecting the bottoms of the troughs.

Assuming that the device is charged with grain or other food stuff, it will be apparent that by turning buttons 19, the weight of such food stuff will cause the valves to swing open and permit a quantity of the grain or other feed to pass down into each trough for its full length so that the hogs, sheep or other animals may obtain access to it, the partitions 17 serving to prevent one or more of the animals from getting into the troughs or from assuming such a position as to prevent others obtaining access to the feed, as only by standing directly opposite can the animals obtain convenient access to the contents of the troughs between any pair of partitions. The latter thus insure the simultaneous feeding of a number of the animals corresponding to the number of compartments into which the troughs are divided. If the material tends to pack in the hopper the rooting of the hogs against the valves moves the latter and thereby causes them to agitate the contents of the hopper and effect the discharge of the feed therefrom into the troughs.

In case of rain the water will overflow the outer walls of the troughs without coming into contact with the feed in the hopper as the lower ends of the valves as hereinbefore stated are above the plane of the upper edges of said walls. If it be desired to feed the animals with a liquid food it may be poured into the troughs without coming into contact with the feed in the hopper, it being understood in this connection that a galvanized iron or other lining may be provided for the troughs when the latter are intended to receive liquid foods, said lining being numbered 21. Mud and dirt can be readily removed from the troughs by means of a hoe or other scraper.

From the above description it will be apparent that I have produced a feed trough embodying the features of advantage enumerated as desirable and I wish it to be understood that I reserve the right to make such changes in the form, proportion, detail construction and arrangement of the parts as do not involve a departure from the spirit and scope of the appended claims.

Having thus described the invention what I claim as new and desire to secure by Letters Patent, is:—

1. A feed trough comprising a hopper having a cover, troughs below and at opposite sides of the hopper with their inner walls converging upward and meeting at a point within the hopper, partitions pitched downward and outward from opposite sides of the hopper into the trough and having their lower edges substantially paralleling the contiguous inner walls of the troughs, valves hinged to the lower edges of the hopper and adapted to swing outward under the partitions or inward of the side walls of the hopper and against the inner walls of the troughs, and turn buttons secured to certain of the partitions and adapted to project inward thereof to hold the valves closed or to be turned to permit said valves to swing open.

2. A feed trough, comprising a hopper, valves hinged to the lower edges of the same, troughs below the hopper and having their inner walls converging upwardly and meeting at a point within the hopper and above the lower edges of the valves thereof and having their outer walls diverging upwardly and terminating in a plane lower than that of the lower edges of the valves, partitions subdividing the troughs and bearing at their opposite ends against the hopper and the outer walls of the troughs, and turn buttons suitably supported and adapted to limit the outward movement of the valves.

In testimony whereof I affix my signature, in the presence of two witnesses.

L ZUARD PEARSON.

Witnesses:
 S. C. GREENFIELD,
 GEORGE RILEY.